United States Patent [19]

Iwahara et al.

[11] Patent Number: 4,923,949

[45] Date of Patent: May 8, 1990

[54] ETHYNYLENE-DISILANYLENE COPOLYMERS AND METHOD OF PREPARING SAME

[75] Inventors: Takahisa Iwahara; Robert C. West, both of Madison, Wis.

[73] Assignee: Kanegafuchi Chemical Industry Co., Ltd., Japan

[21] Appl. No.: 227,695

[22] Filed: Aug. 3, 1988

[51] Int. Cl.$^5$ .............................................. C08G 77/04
[52] U.S. Cl. ........................................ 528/33; 528/10; 528/43
[58] Field of Search ............................. 528/10, 33, 43

[56] References Cited

U.S. PATENT DOCUMENTS 4,800,221  1/1989  Marko ..................................... 528/35

OTHER PUBLICATIONS

West, et al. "Phenylmethylpolysilanes: Formable Silane Copolymers with Potential Semiconducting Properties," JACS, 103, No. 24, 1981, 7352–7354.

*Primary Examiner*—Melvyn I. Marquis
*Attorney, Agent, or Firm*—Welsh & Katz, Ltd.

[57] ABSTRACT

1,2-Dichlorodisilanes are reacted with organometallic derivatives of 1,2-diethynyldisilane to yield the copolymer:

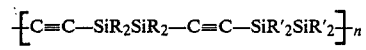

where R and R' are alkyl or aryl groups having carbon atoms numbering less than ten.

11 Claims, No Drawings

ETHYNYLENE-DISILANYLENE COPOLYMERS AND METHOD OF PREPARING SAME

BACKGROUND OF THE INVENTION

This invention relates to a new composition of matter and a method for preparing the composition and more particularly, to an ethynylene-disilanylene copolymer and a method for ethynylene-disilanylene copolymers.

Various types of organic, metal organic, and inorganic materials are known to have unusual highly anisotropic and potentially useful electric, optical, and/or magnetic properties. Such materials are known to be useful in fabricating electrically conducting materials, semi-conductors, electronic devices, and electromagnetic or acoustic sensors. The utility of some of these materials is frequently limited by such factors as weight, mechanical fragility, fabrication problems, corrosion, scarcity, and high costs.

Electroconductive organic materials have properties which can overcome or minimize such problems, and have the capability to be easily fabricated into films, filaments, and other shapes. Some of these materials are simply an organic compound containing a conductive material therein, such as a metal or graphite. Others comprise polymeric organic material whose electrical conductivities are established by chemical doping with electron acceptor and/or electron donor dopants. In general, the polymeric materials susceptible of establishing such electrical conductivity are characterized by highly delocalized $\pi$ electron conjugation, or by $\sigma$-electron delocalization which are found in, for example polysilane materials. Polysilanes can also be used as resist materials, $\beta$-SiC precursors, as well as an initiator for radical polymerization.

Electron delocalization between Si-Si $\sigma$ bonds and $\pi$ systems has been conclusively established in various polysilyl compounds containing unsaturated or aromatic groups. But examples of Si-Si $\sigma$-$\pi$ electron delocalization in a polymer backbone have heretofore been relatively few. $\sigma$-$\pi$ electron delocalization in such polysilyl compounds generally results in a longer wavelength shift by 20-30 nm in UV spectra relative to the absorption maximum of hexamethyldisilane which just has $\sigma$-electrons. Representative values of absorption max in UV spectra of some Si-Si $\sigma$-$\pi$ electron delocalized compounds are set forth in Table I. Compounds 2-4 of Table I, because of their strong absorption over 215 nm, should have a high degree of $\sigma$-$\pi$ electron delocalization and, in fact, may exhibit a high potential for use as an electroconductive material.

TABLE I

UV Absorption Maxima of $\sigma$ (Si—Si)-$\pi$ Electron Delocalized Compounds

| Compound | $\lambda$ max (nm) |
| --- | --- |
| 1. Me$_3$Si—SiMe$_3$ | 197-200 |
| 2. PhMe$_2$Si—SiMe$_3$ | 231 |
| 3. HC≡C—SiMe$_2$SiMe$_2$—C≡CH | 217 |
| 4. Me$_3$Si—C≡C—SiMe$_2$SiMe$_2$—C≡C—SiMe$_3$ | 223, 230 |

Further, like other polysilanes, the copolymers of the subjection invention may undergo conversion to silicon carbide when heated to high temperatures.

SUMMARY OF THE INVENTION

Therefore an objective of the subject invention is a new class of compounds, specifically, ethynylenedisilanylene copolymers.

A further object of the subject invention is a method of preparing ethynylene-disilanylene copolymers.

These and other objects of the subject invention are attained by either of two methods. In the first of these, 1,2-diethynyldisilane is treated with n-butyllithium in THF solution to form a dilithium species of 1,2-diethynyldisilane, which is then reacted with 1,2-dichlorodisilane in tetrahydrofuran to achieve the ethynylene-disilanylene alternating copolymer having repeating units of the formula:

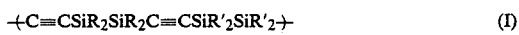   (I)

(or)

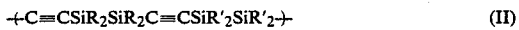   (II)

dependent on the identity of the substituents on the silicon in the starting materials. In general, R should be an alkyl group of 1-10 carbon atoms or an aryl group of 6-10 carbon atoms. A second route for the preparation of the ethynylene-disilanylene-copolymers of the subject invention involves treating the 1,2-diethynyldisilane with a Grignard reagent, such as ethylmagnesium bromide, in a tetrahydrofuran solution to form the di-Grignard THF solution of the formula BrMgC≡C-SiR$_2$SiR$_2$C≡CMgBr. The diGrignard reagent is reacted with a dichlorodisilane in a relatively concentrated ($>\sim$0.5M) tetrahydrofuran solution which is then evaporated to leave the polymer as set forth in compounds I and II above.

DETAILED DESCRIPTION OF THE INVENTION

In the preparation of ethynylene-disilanylene copolymers, a 1,2-diethynyldisilane monomer of the formula HC≡C-SiR$_2$SiR$_2$C≡CH, where R is an alkyl group or an aryl group of 1-10 carbon atoms, is placed into solution with a organometallic compound RM where R is either methyl, n-propyl, isopropyl, n-butyl, t-butyl, or other alkyl group (with C<6), and M is an alkaline element such as Li, Na, or K. Preferably, $n$C$_4$H$_9$Li (nBuLi) is used. The RM is added to the monomer in either a hexane or tetrahydrofuran solution in a ratio (by mol ®) of over 2:1 RM to monomer. As such, the monomer and RM solution is placed under nitrogen atmosphere at room temperature about 1-24 hours, thereby forming the dialkali metal reagent MC≡CSiR$_2$SiR$_2$-C≡CM. (At this stage, the alkali metal reagent may be purified by recrystallization from a suitable solvent (e.g., n-hexane) under inert conditions if the reagent is a solid.)

In general, tetrahydrofuran is used as a solvent in each of the reactions in the method of the subject invention. However, other ethereal solvents, such as diethylether, di-n-butylether, dimethoxyethane, dioxanes, etc., may also be used, as known in the art.

The alkali metal reagent is treated with a solution of dichlorodisilane of the formula ClSiR'$_2$SiR'$_2$Cl (R'=CH$_3$, $n$C$_4$H$_9$, other alkyl group (C<10) or a phenyl group (C$_6$H$_5$)) at 0°-70° C. for 1-24 hours under a nitrogen atmosphere.

A representative 1,2-dichlorodisilane, ClSi(CH$_3$)$_2$Si(CH$_3$)$_2$Cl, may be obtained from specialty chemical manufacturers or it may be prepared from hexamethyldisilane (CH$_3$)$_3$SiSi(CH$_3$)$_3$ by mixing at 50° C.-60° C. with 2 moles acetyl chloride and 2 moles aluminum chloride.

After filtering, evaporating, and drying under vacuum, the polymer $-\!\!-\!(\!-C\!\equiv\!CSiR_2SiR_2\!-\!)_n$ is isolated. Purification can be accomplished by reprecipitation from a suitable combination of solvents, for example, chloroform/isopropylalcohol or tetra-hydrofuran/ethyl alcohol, etc. The solvents are pumped off to leave a residue which is dissolved in chloroform, washed with an aqueous ammonium chloride solution, with water, and then dried over calcium chloride.

In an alternate method of preparation of ethynylenedisilanylene copolymers of the subject invention, a Grignard reagent may be used. In this method, the 1,2-diethynyldisilane is treated with the Grignard reagent in a solution of THF in a ratio of 2 moles of the Grignard reagent for every 1 mole of the disilane. The Grignard reagent may comprise methyl, ethyl, or other alkyl metallic halide such as CH$_3$MgBr, CH$_3$MgI, CH$_3$CH$_2$CH$_2$MgCl, $n$C$_4$H$_9$MgCl, sec-C$_4$H$_9$MgCl and t-C$_4$H$_9$MgCl; the preferred Grignard reagent is ethyl magnesium bromide (EtMgBr). Other alkyl metallic halides may be used as Grignard reagents, as known in the art. The disilane is treated with 2 moles of the Grignard reagent (in this example EtMgBr) in dry tetrahydrofuran at room temperature and/or under reflux for approximately 1½ hours (temperature=0°-70° C.) to form the diGrignard reagent BrMgC≡CSiR'$_2$SiR'$_2$C≡CMgBr. The diGrignard reagent is then treated with a dichlorodisilane in a concentrated tetrahydrofuran solution at 0°-70° C. for 1-24 hours. Tetrahydrofuran is then evaporated to leave a white solid which may be washed with aqueous ammonium chloride, alcohol, and then dried, to result in a polymer of $-\!\!(\!-C\!\equiv\!CSiR_2SiR_2\!-\!)_n$. As above, tetrahydrofuran is generally used as a solvent in each of the reactions in the method of the subject invention. However, other ethereal solvents, such as diethylether, di-n-butylether, dimethoxyethane, dioxanes, etc., may also be used, as known in the art. It is important that the solution of the reaction mixture of the diGrignard reagent and the dichlorodisilane be concentrated, in order to obtain a good yield of polymer. As is generally known to happen in polymerization reactions, the concentration of the reactants in the reaction mixture has a substantial effect on the resulting yield and chain length. Thus, such concentration levels can be used to control these parameters; dilute reaction solutions are, in general, to be avoided.

EXAMPLE I 1.0 g (6.01 mmol) of 1,2-ethynyl-1,1,2,2-tetramethyldisilane (HC≡C—Si(CH$_3$)$_2$Si(CH$_3$)$_2$—C≡CH was treated with 5.1 ml (12.7 mmol) of 2.5M n-BuLi hexane solution (purchased from Aldrich Chemical Co., Inc.) in 30 ml of dry THF (distilled from Na/(C$_6$H$_5$)$_2$CO) at room temperature under N$_2$ atmosphere for 4 hours to form the dilithium reagent (LiC≡C—Si(CH$_3$)$_2$Si(CH$_3$)$_2$—C≡CLi).

The dilithium reagent formed was treated with 1.13 g (6.01 mmol) of 1,2-dichloro-1,1,2,2-tetramethyldisilane (Cl(CH$_3$)$_2$SiSi(CH$_3$)$_2$Cl) in 2 ml of THF and refluxed overnight under N$_2$ atmosphere.

The solvent was pumped off to leave a pale yellow viscous wax. It was dissolved in 150 ml of chloroform (CHCl3), washed with aqueous ammonium chloride solution (NH$_4$Cl aq., 50 ml×2) and then with 50 ml of water and dried over CaCl$_2$. The solution was filtered, evaporated, and dried under vacuum to leave about 1.4 g (87%) of the crude polymer III as slightly sticky solid.

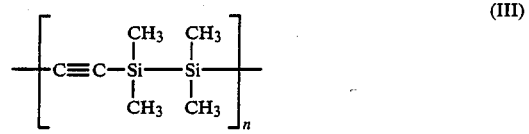

The polymer can be purified by reprecipitation from CH$_3$Cl/isopropyl alcohol. The purified polymer has λmax=240 nm in UV spectrum. The Mw was 4600, and M$_n$=2900 by GPC (Molecular weights are relative to a polystyrene standard. THF was used for eluent). The IR spectrum shows (almost) no Si—H, Si—O—Si functional group. The melting point is 140°-157° C.

EXAMPLE II 1.0 g (6.01 mmol) of HC≡C—Si(CH$_3$)$_2$Si(CH$_3$)$_2$—C≡CH was treated with 6.3 ml (12.6 mmol) of 2.0 M EtMgBr in THF solution (purchased from Aldrich Chemical Co., Inc.) in 8 ml of dry THF at room temperature for 1.5 hours to form the diGrignard reagent BrMgC≡C—Si(CH$_3$)$_2$Si(CH$_3$)$_2$C≡CMgBr.

The diGrignard reagent formed was then treated with 1.13 g (6.01 mmol) of Cl(CH$_3$)$_2$SiSi(CH$_3$)$_2$Cl in 1.5 ml of THF at room temperature overnight. The THF was pumped off to leave a white solid. It was washed with water (20 ml×3), then ethanol (20 ml×2), and dried under vacuum to leave about 1.3 g (81%) of the crude polymer of compound III as a white solid. After reprecipitation from CHCl$_3$/isopropyl alcohol, the purified polymer has λ max=238 nm in the UV spectrum. Mw=10,000, M$_n$=4000. The IR spectrum shows (almost) no Si—H, Si—O—Si functional groups.

EXAMPLE III 1.0 g (2.90 mmol) of HC≡C—Si(nC$_4$H$_9$)$_2$Si(nC$_4$H$_9$)$_2$C≡CH was treated with 3.75 ml (6 mmol) of 1.6M nBuLi hexane solution in 20 ml of dry THF at room temperature for 2 hours to form the dilithium reagent, which was then treated with 1.05 (2.8 mmol) of Cl(nC$_4$H$_9$)$_2$SiSi(nC$_4$H$_9$)$_2$Cl in 3 ml of THF at room temperature overnight.

Cl(nC$_4$H$_9$)SiSi(nC$_4$H$_9$)$_2$Cl may be prepared as follows:

2 moles of nC$_4$H9Li hexane solution is slowly added to 1 mole of phenyl trichlorosilane (C$_6$H$_5$SiCl$_3$) in THF at −78° C. and allowed to be mixed for eight hours. This results in (C$_6$H$_5$)(nC$_4$H$_9$)$_2$SiCl and small amounts of (C$_6$H$_5$)Si(nC$_4$H$_9$)$_3$ which can be removed by fractional distillation. 1 mole of C$_6$H$_5$(nC$_4$H$_9$)$_2$SiCl was treated with 1 mole of lithium in THF at 0° C. The mixture is allowed to be mixed, warming to room temperature for 15 hours to give (C$_6$H$_5$)(nC$_4$H$_9$)$_2$SiSi(nC$_4$H$_9$)$_2$(C$_6$H$_5$), which can be purified by distillation. HCl gas is introduced to (C$_6$H$_5$)(nC$_4$H$_9$)$_2$SiSi(nC$_4$H$_9$)$_2$(C$_6$H$_5$) in benzene solution in the presence of a catalytic amount of aluminum chloride (AlCl$_3$), and allowed to react for 20 minutes, resulting in Cl(nC$_4$H$_9$)$_2$SiSi(nC$_4$H$_9$)$_2$Cl, which can be purified by fractional distillation.

The solvent was evaporated by pumping from the dilithium reagent/dichlorodisilane reaction mixture. To the residue was added 50 ml of hexane and 20 ml of aqueous NH$_4$Cl solution The organic layer was separated, washed, with aqueous NH$_4$Cl solution (30 ml×2), with water (30 ml×1), and dried over CaCl$_2$. The solution was filtered, evaporated, and dried over CaCl$_2$. The solution was filtered, evaporated, and dried under vacuum to have about 1.3 g (73%) of the crude polymer as a pale yellow sticky solid set forth as compound IV below:

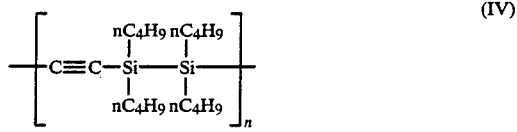

The reaction product can be purified by reprecipitation from THF/ethanol. It shows λ max=244 m in UV spectrum; Mw=10700, M$_n$=3700. The melting point is 64°–70° C. The IR spectrum shows no Si—H, Si—O—Si functional groups.

TABLE II
Properties of Disilanylene - Acetylene Polymers

| Compound | Appearance | mp(°C.) | UV(nm) | Mw | M$_n$ | Mw/M$_n$ |
|---|---|---|---|---|---|---|
| III | White Solid | 140–157 | 234, 240 | 4600 | 2900 | 1.6 |
| III | White Solid | | 232, 239 | 10000 | 7000 | 1.4 |
| IV | White Sticky Solid | 64–70 | 213, 244 | 10700 | 3700 | 2.9 |
| IV | White Sticky Solid | | 210, 243 | 14800 | 3400 | 4.4 |
| I | Clear Viscous Liquid (R=CH$_3$, R'=nC$_4$H$_9$) | | 214(sh), 226, 240(sh) | 2800 | 1200 | 2.3 |
| I | Clear Viscous Liquid (R=nC$_4$H$_9$, R'=CH$_3$) | | 215(sh), 227, 239(sh) | 3400 | 1300 | 2.6 |

In preparing the compounds described above for the exhibition of electroconductive properties, the process commonly referred to as doping was utilized. A wide variety of doping materials may be employed to attain electrical conductivity of the compound. Doping materials suitable for effecting an increase in the electrical conductivity of the polymers of the subject invention are generally electron acceptor dopants, including for example Br$_2$, ICl, IBr, AsF$_5$, SbF$_5$, Cl$_2$, HBr, BF$_3$, BCl$_3$, SO$_2$, SO$_3$, Cl$_2$, PlF$_3$, NO$_2$, HCN, ICN, O$_2$, SiF$_4$, NO, C$_2$H$_2$, and transition metal carbonates, phosphine, and olefin derivatives. The preferred dopants are AsF$_5$ or SbF$_5$.

In doping, the compounds are first prepared by the method of the subject invention. The compounds are contacted with the dopant which may take place in the vapor phase or in solution. In either case, doping is by uptake of the dopant molecules into the polymer structure, which occurs pursuant to a degree proportional to the dopant concentration and the contacting period. For example, the polymeric compounds, in solid form, may be contacted in solution by introduction of a gas for a contacting period ranging from a few seconds to over 24 hours to provide the desired degree of doping, and thereby provide the doped substance with a room temperature electroconductivity within the range of from about $10^{-1}$ to about $10^{-7}$ ohm$^{-1}$ cm$^{-1}$.

The doping procedure may be carried out by placing the copolymer in a solution of the dopant in an appropriate organic solvent inert to the copolymer, such as for example THF, hexane, or toluene. By trial and error, the length of time necessary to leave the copolymer in the solution is found which will obtain the desired degree of doping. At the completion of the doping, the doped material is removed from the solution and rinsed in an additional amount of the organic solvent to remove any residual doping solution therefrom. The excess solvent is pumped off by a vacuum and the conductivity may be measured in a manner known in the art.

When the compounds of formulas I, II, III, and IV are separately heated to 1100° C. under an argon atmosphere, the resulting compound is SiC.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

We claim:

1. A method of preparing an ethynylene disilanylene polymer comprising the steps of:
   (a) forming a diGrignard reagent by reacting a 1,2-diethynyldisilane of the formula HC≡C—SiR'$_2$SiR'$_2$—C≡CH with a Grignard reagent comprising an alkyl metallic halide;
   (b) adding ClSiR$_2$SiR$_2$Cl and permitting the mixture to stand and react at room temperature; and
   (c) isolating the resulting ethynylene disilanylene copolymer having a repeating unit of the formula:

where R and R' is an alkyl of 1–10 carbon atoms or an aryl group of 6–10 carbon atoms.

2. The method of claim 1 wherein R is selected from the group consisting of methyl and n-butyl.

3. The method of claim 1 wherein said Grignard reagent is selected from the group of C$_2$H$_5$MgBr, CH$_3$MgBr, CH$_3$MgI, and nC$_3$H$_7$MgCl.

4. The method of claim 1 wherein each reaction occurs in an ethereal solvent.

5. The method of claim 4 wherein said solvent is selected from the group consisting of tetrahydrofuran, diethylether, di-n-butylether, dimethoxyethane and dioxanes.

6. The method of preparing an ethynylene disilanylene copolymer comprising the steps of:
   (a) adding an organometallic reagent of the formula RM where R is an alkyl group and M is an alkali metal selected from the group consisting of Li, Na, and K, to a diethynyldisilane of the formula HC≡C—SiR$_2$SiR$_2$C≡CH where R is an alkyl or aryl group to form a diethynyldisilane dimetallic reagent;

(b) adding, a solvated dichlorodisilane of the formula ClSiR'$_2$SiR'$_2$Cl where R' is an alkyl or an aryl group;

(c) letting the dichlorodisilane/dimetallic reagent mixture sit and react at 0–70° C. for about 1–24 hours; and (d) isolating from the reaction mixture a copolymer having a repeating unit of the formula:
$+C\equiv CSiR_2SiR_2C\equiv CSiR'_2SiR'_2+$.

7. The method of claim 6 wherein R and R' are selected from the group consisting of methyl, isopropyl, n-propyl, n-butyl, tert-butyl, and phenyl.

8. The method of claim 6 wherein R is an alkyl group or aryl group having carbon atoms less than ten.

9. The method of claim 6 wherein R' is an alkyl group or aryl group having carbon atoms less than ten.

10. The method of claim 6 wherein each reaction occurs in an etheral solvent.

11. The method of claim 6 wherein said solvent is selected from the group consisting of tetrahydrofuran, diethylether, di-n-butylether, dimethoxyethane and dioxanes.

* * * * *